CARL HARDEN
STANLEY G. NICHOLAS
RONALD B. McKINNIS
INVENTORS

BY *Lyon & Lyon*
ATTORNEYS

Aug. 19, 1958 C. HARDEN ET AL 2,848,025
APPARATUS FOR HIGH-OIL CITRUS JUICE RECOVERY
Filed April 15, 1954 2 Sheets-Sheet 2
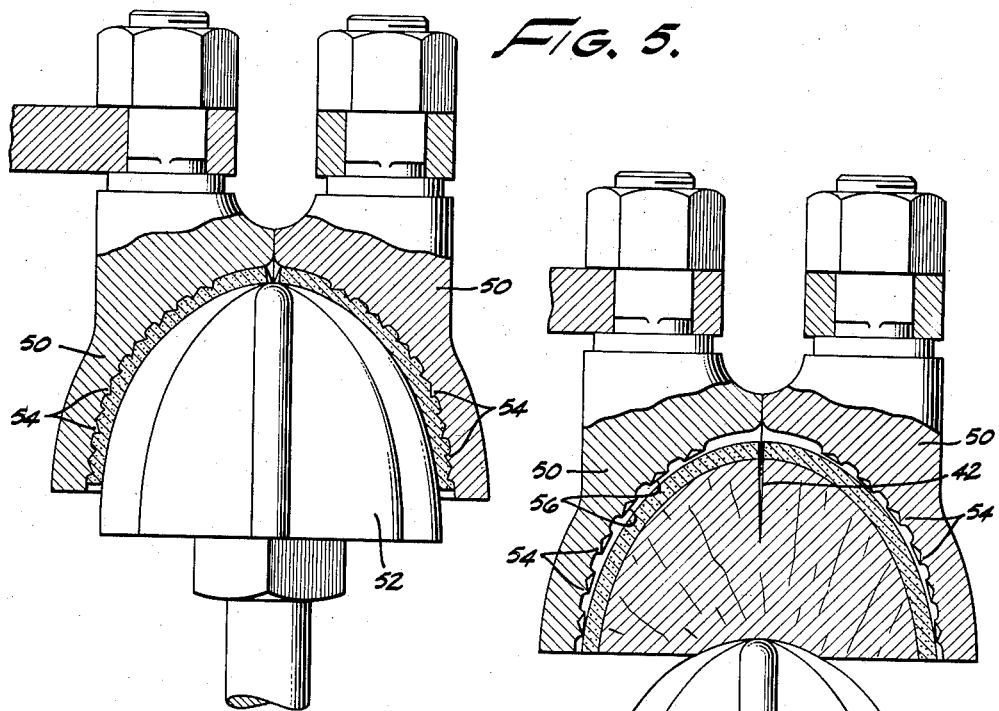
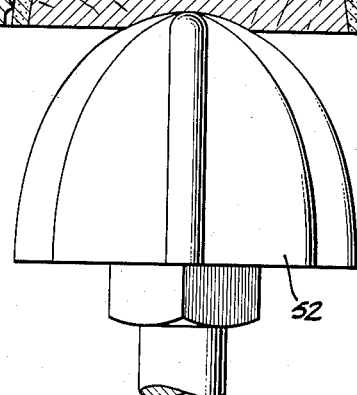
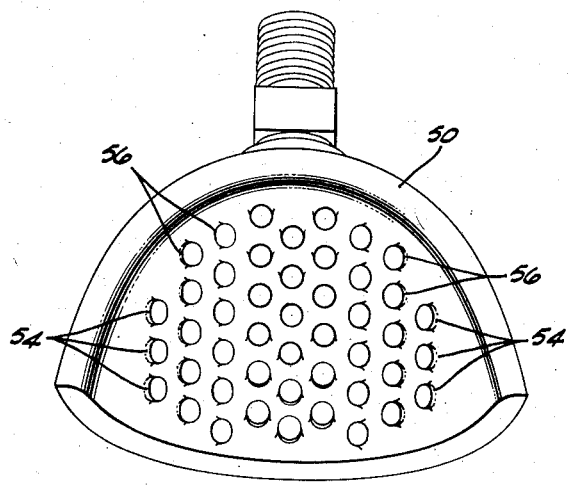
CARL HARDEN
STANLEY G. NICHOLAS
RONALD B. McKINNIS
INVENTORS
BY
ATTORNEYS

United States Patent Office 2,848,025
Patented Aug. 19, 1958

2,848,025

APPARATUS FOR HIGH-OIL CITRUS JUICE RECOVERY

Carl Harden, Pasadena, and Stanley G. Nicholas, Whittier, Calif., and Ronald B. McKinnis, Winter Haven, Fla., assignors to Brown Citrus Machinery Corp., Whittier, Calif., a corporation of California Application April 15, 1954, Serial No. 423,427

4 Claims. (Cl. 146—3)

This invention relates to an improved means for high-oil citrus juice recovery.

With the development of citrus juices concentrated in vacuum pans at low temperatures, there has developed a new need for a high quality juice containing far greater proportions of peel oil than heretofore have been tolerated. This is caused by the fact that when citrus juices are concentrated in a vacuum pan almost all of the oil is evaporated and carried out with the water being removed, with the result that the concentrated juice from the evaporator is rather bland. The usual practice is to overconcentrate the juice, then to cut it back to the normal canning concentration by adding high oil content juice. The optimum oil content of the reconstituted juice is about .005 to .008 percent peel oil. To accomplish this the high oil content cut back juice should have substantially twelve times this much oil, that is, .06 to .096 percent, since it usually is mixed one part to two parts of the bland juice and the mixture diluted one part to three parts water before consumption.

It is, therefore, an object of this invention to provide a means for extracting peel oil from a citrus fruit peel.

It is a further object of this invention to provide means for extracting juice from citrus fruit with the desired high peel oil concentration.

Other objects and advantages will be readily apparent from the following description.

In the drawings:

Figure 4 is an enlarged section taken along line 4—4 of Figure 1.

Figure 5 is an enlarged sectional view similar to Figure 4 with the reamer in the fully elevated position.

Figure 6 is a side elevation of one of the half cups.

The apparatus of this invention is adapted to be used in a citrus juice extracting machine of the type disclosed in United States Patent No. 2,199,876, issued May 7, 1940, to William O. Brown. In the machine described therein, the fruit is carried from a hopper into engagement with a stationary knife where the fruit is halved. The fruit halves slide across the knife blade and onto curved divider plates. The half fruits are then delivered into cups which grasp the fruit with the cut face downwardly and carry it into position for the reaming operation wherein rotating reamers enter the fruit. A plurality of cups are mounted upon a horizontal cup carrier unit which rotates on a vertical axis. Below the cup carrier unit is a reamer carrier unit which is mounted to rotate upon an inclined axis in synchronism with the cup unit so that each reamer enters a corresponding cup during a portion of its path of travel.

Referring now specifically to the drawings, the fruit in this instance, oranges, is supported upon conveyor cups 10 which cups are supported upon endless chains 12 and 14. The chains are trained about suitable sprockets (not shown) driven by a suitable source of power to present the fruit to the stationary halving knife 16. The knife 16 cuts the fruit in half, in the maner described the above referred to Brown patent. The knife 16 is supported by suitable brackets 18 and 20, which in turn are mounted upon the frame of the machine.

Figure 1:
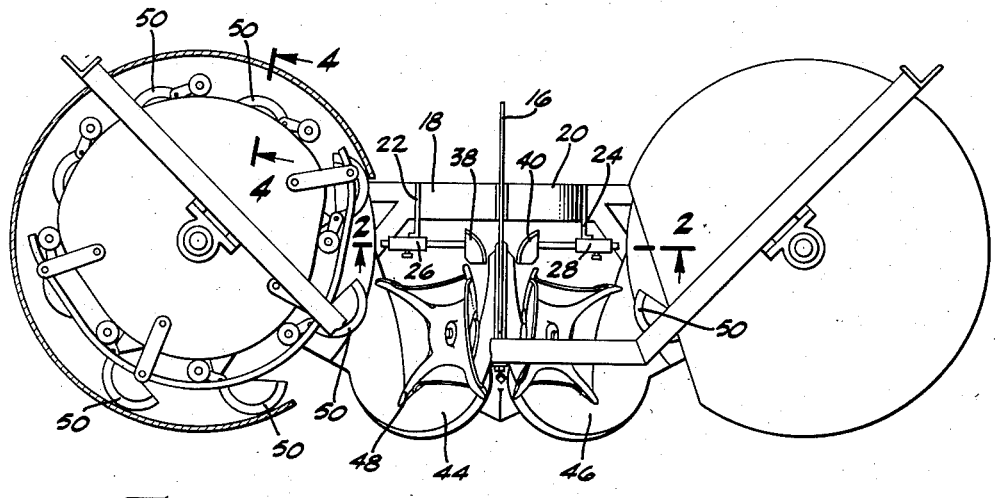
Figure 1 is a fragmentary top plan view of a juice extracting machine.
Figure 2:
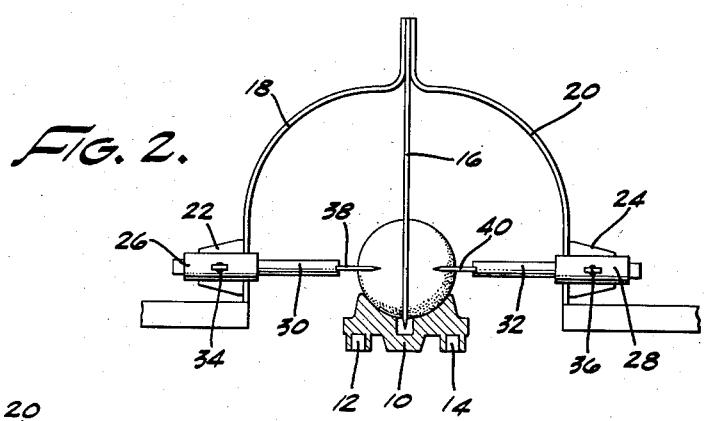
Figure 2 is an enlarged section taken along line 2—2 of Figure 1.
Figure 3:
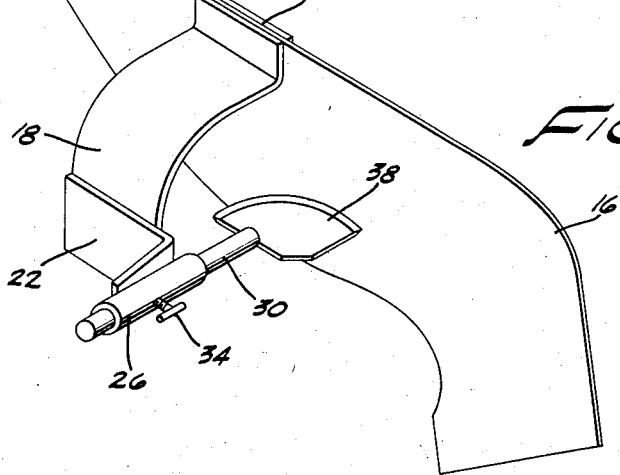
Figure 3 is an enlarged fragmentary prespecive view of the divider knife and one of the auxiliary knives.

Mounted upon the brackets 18 and 20 are further brackets 22 and 24, each of which supports sleeves 26 and 28. The knife shafts 30 and 32 slidably fit within the sleeves and are secured by a set screw 34 or 36. Thus the distance of the auxiliary knife blades 38 and 40 from the stationary blade 16 can be varied. The blades 38 and 40 are curved as seen in Figure 3 so that as the fruit is cut in halves by stationary knife 16 an additional cut such as 42 (see Figure 4) is formed in each fruit half, roughly normal to the plane of cutting of the stationary knife.

Curved divider plates 44 and 46 are provided which receive the fruit halves after they leave the knives. Since both halves are treated in the same manner, only the path of the half fruit directed along divider plate 44 will be described in detail.

A star wheel 48 is caused to rotate as described in the above referred to Brown patent, advancing the fruit to the half cups 50, which close about the half fruit, as also described in the above referred to Brown patent. The fruit is then advanced to the reamers 52 which function to extract the juice from the fruit as described in the hereinbefore identified Brown patent.

The half cups 50 are the same, hence, only one will be described in detail. Reference is made to Figures 4 through 6, which illustrate the formation of the half cups and their functioning during reaming of the fruit half. The preferred embodiment of the cups contemplates an all-metal cup having a plurality of conical dimples 54 on its interior or peel contacting surface. These conical dimples are truncated as at 56 and then machined to form an inverted cone within the truncated cone or dimples 54. This operation leaves sharp rising rings with sloping sides. These rings cut into the peel releasing the peel oil when the reaming burr 52 presses the peel against the conical dimples 54 as seen in Figure 5.

As previously described a cut 42 had been made in the fruit by auxiliary knife 38. This cut is preferably about three fourths of an inch deep and as the reaming burr extracts the juice from the fruit half some of the juice is forced out of cut 42 and this juice washes the peel oil released by the cutting of the peel by the conical dimples 54 into the collecting pan (not shown).

While what hereinbefore has been described is the preferred embodiment of this invention, it is readily apparent that alterations and modifications can be resorted to without departing from the scope of this invention and such alterations and modifications are intended to be included within the scope of the appended claims.

We claim:

1. In a citrus juice extracting machine of the type using a reamer for extracting the juice, the combination with said reamer of: cup means for conveying a half fruit to said reamer, and a plurality of raised, sharpened elements projecting within said cup means, each of said raised elements providing a cutting edge of substantial length confining an area of the peel, said cutting edges cutting the skin of the fruit and releasing peel oil from said half fruit when said fruit is presented to the reamer, said raised elements being disposed in relatively closely spaced relation over substantially the entire area of the inside of said cup means and in such manner as to permit passage of oil therebetween.

2. The juice extracting machine defined in claim 1 wherein a means is provided to form a cut through the peel of a fruit half so that when said fruit half is presented to the reamer, juice is forced through said cut to wash peel oil from the skin of the fruit.

3. In a citrus juice extracting machine of the type using a reamer for extracting the juice, the combination of: cup means for conveying a half fruit to said reamer, and a plurality of raised, sharpened rings projecting within said cup means, each of said rings providing an annular cutting edge for cutting the skin of the fruit and releasing peel oil from said half fruit when said fruit is presented to the reamer, said raised rings being disposed in relatively closely spaced relation over substantially the entire area of the inside of said cup means.

4. In a citrus juice extracting machine of the type using a reamer for extracting the juice, the combination of: cup means for conveying a half fruit to said reamer, and a plurality of truncated cones projecting within said cup means, each cone having an inverted cone formed therein providing a sharpened annular cutting edge for cutting the peel of said fruit half and releasing peel oil therefrom when said fruit is presented to said reamer, said truncated cones being disposed in relatively closely spaced relation over substantially the entire area of the inside of said cup means.

References Cited in the file of this patent

UNITED STATES PATENTS

| | | |
|---|---|---|
| 2,199,876 | Brown | May 7, 1940 |
| 2,288,756 | Thompson | July 7, 1942 |
| 2,643,693 | Harden | June 30, 1953 |